United States Patent [19]
Cruickshank et al.

[11] 3,773,015
[45] Nov. 20, 1973

[54] AQUARIUM DIVER

[76] Inventors: Roy W. Cruickshank, 1771 Hannah Cir.; Jack O. Knight, 2160 N. Connell Ave., both of Simi Valley, Calif.

[22] Filed: Mar. 27, 1972

[21] Appl. No.: 238,053

[52] U.S. Cl. .................................... 119/5, 46/92
[51] Int. Cl. ............................................ A01k 64/00
[58] Field of Search ............................ 119/5; 46/92

[56] References Cited
UNITED STATES PATENTS

| | | | |
|---|---|---|---|
| 3,265,388 | 8/1966 | Kane | 119/5 X |
| 2,836,927 | 6/1958 | Warner | 46/92 |
| 2,844,912 | 7/1958 | Sebesta | 119/5 X |
| 1,916,646 | 7/1933 | Tycko | 46/92 X |

FOREIGN PATENTS OR APPLICATIONS

| 1,175,727 | 11/1958 | France | 119/5 |
|---|---|---|---|

*Primary Examiner*—Louis G. Mancene
*Assistant Examiner*—James H. Czerwonky
*Attorney*—Bruce D. Jimerson

[57] ABSTRACT

A novel valve arrangement is used to control the release of air from the helmet of a miniature diver so as to cause the diver to periodically dive and ascend within an aquarium tank. The cycle period can be varied by controlling the rate at which air is supplied from a conventional aquarium air source. The diver is slidably mounted on a hollow tube for movement between first and second stations. At the first station, the tube has an opening to admit air to the interior of the diver to increase its buoyancy. The admitted air is retained in the diver until it reaches the second station. The tube has a necked down portion at the second station to release the air contained within the diver.

4 Claims, 6 Drawing Figures

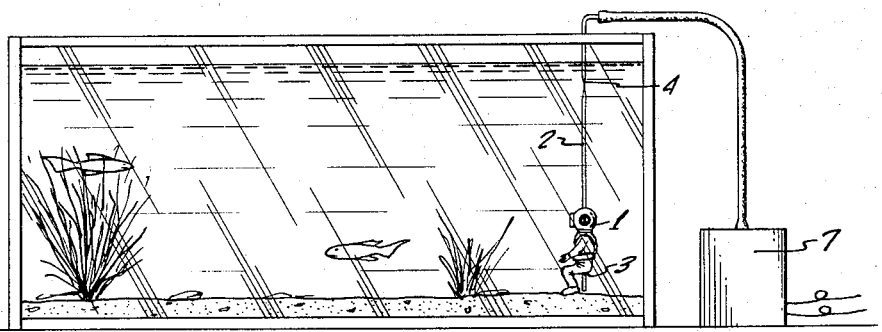
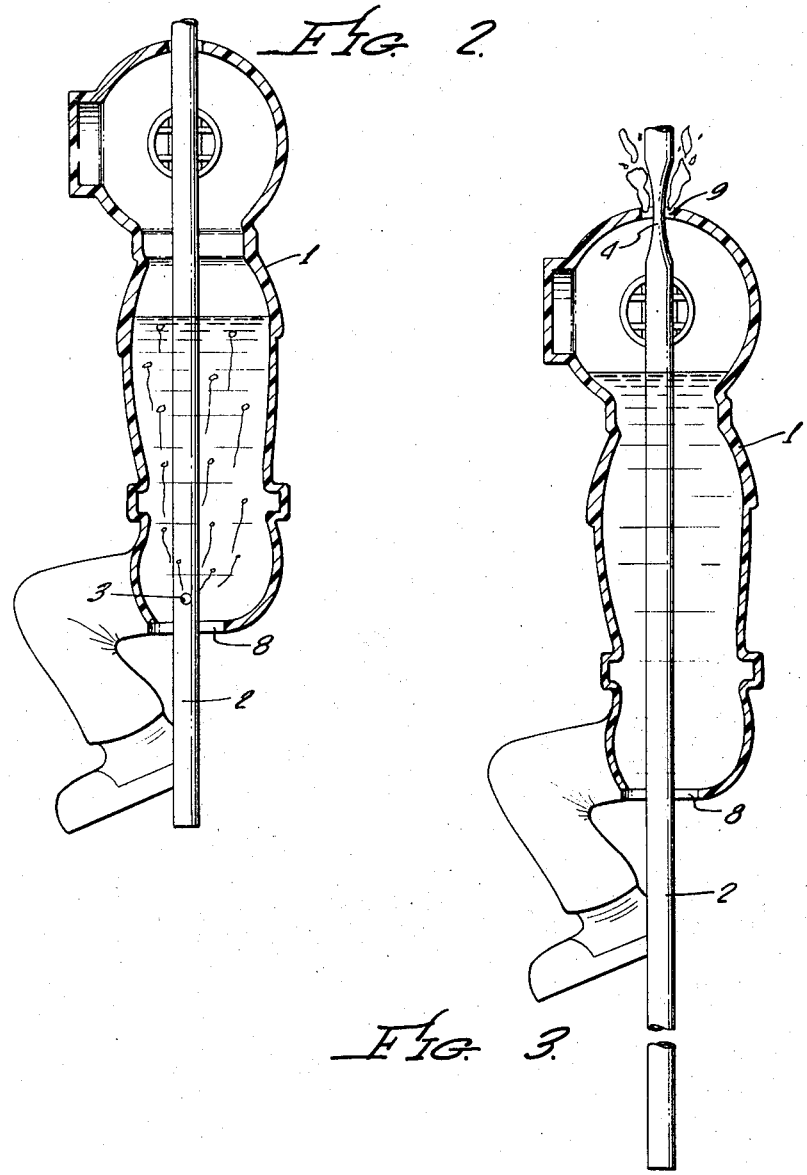

AQUARIUM DIVER

BACKGROUND OF THE INVENTION

Numerous devices for producing mechanical motion within an aquarium have been proposed and marketed in recent years. Typical of such items are the giant bubbling claims, water wheels, and sunken treasure chests with periodically opening lids, etc. Such prior art devices provide a modicum of amusement while adding color and decor to the aquarium. There is however, no commercially available apparatus for producing extensive linear motion within the aquarium. What is actually desired is an apparatus which causes an object to repetitively travel between two stations within an aquarium.

Accordingly, a primary object of the present invention is to provide a means for propelling an object within an aquarium.

Another object of the present invention is to provide a mechanical object which will repetitively travel between two stations within an aquarium.

Another object of the invention is to provide a miniature diver which will periodically ascend and descend within an aquarium tank.

A further object of the invention is to provide a valve arrangement for controlling the motion of a miniature diver.

Another object of the invention is to provide a diver valve having no moving parts other than the diver itself.

Another object of the present invention is to provide a miniature diver which will operate from a conventional air source.

Other objects and advantages of the present invention will be obvious from the detailed description of a preferred embodiment given herein below.

SUMMARY OF THE INVENTION

The aforementioned objects are realized by the present invention comprising an aquarium object such as a miniature diver which is caused to periodically surface and dive with a cycle period dependent upon the rate at which air is supplied from an air source. In a preferred embodiment, the diver rides up and down on a vertical translucent tube which has a small air outlet at the bottom and a "necked down" diameter near the top. The diver has a large bottom opening through which the air bubbles enter and an upper opening slightly larger than the diameter of the tube. When the diver is near the bottom, the air bubbles enter the bottom opening and are trapped inside the diver. When the diver becomes buoyant, it rises until the "necked down" portion of the tube is reached, at which point the trapped air escapes and the diver again returns to the bottom. Other embodiments include a sloped tube which produces a diagonal motion across the aquarium, various poppet valves, and other traveling objects such as octopus and the like.

DESCRIPTION OF THE DRAWINGS

FIG. 1 is a side view showing the diving apparatus within an aquarium.

FIG. 2 is a cross-sectional view of the diver and tube when the diver is at the bottom.

FIG. 3 is a cross-sectional view illustrating how the necked down portion of the tube functions to release the trapped air when the diver approaches the surface.

DESCRIPTION OF A PREFERRED EMBODIMENT

Figure 4:
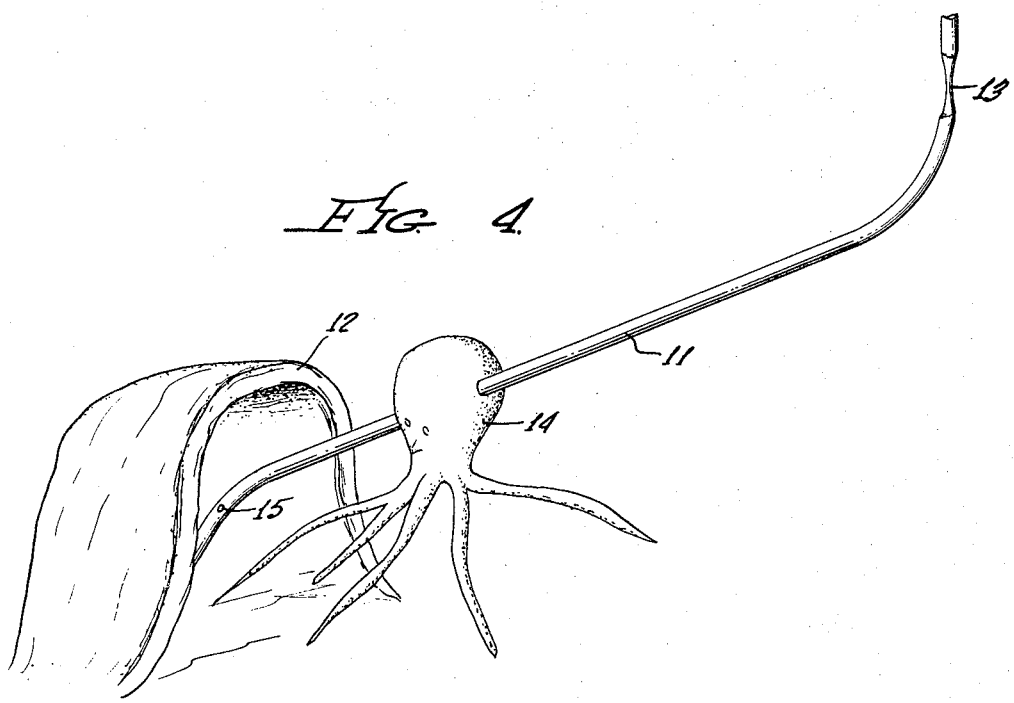
FIG. 4 shows an alternative embodiment employing a slanted S-shaped tube for guiding an octopus.

Adverting to the drawings, and particularly FIGS. 1, 2 and 3, a preferred embodiment of the invention comprises: a hollow miniature diver 1 which, for most realistic results, is posed in a semi crouch position as shown, and a translucent tube 2 having a small air hole 3 near the bottom and a necked down portion 4 near the top. One end of the tube is closed off (in the embodiment shown in FIG. 1 it is the bottom end 6 which is closed), and the other end is connected by flexible tubing to an aquarium aerator 7. The diver is preferably made of plastic such as polyethelyne or any other material having a density slightly greater than water so that no additional weights are required to sink the diver when all the air is expelled. The diver 1 has a relatively large opening 8 on his underside and a smaller opening 9 (slightly larger than the diameter of the tube 2) in his helmet. The tube 2 runs completely through the diver via holes 8 and 9 — and serves the multiple function of guide, air supply and valve.

In operation, air pumped from the air source 7 escapes from the hole 3 and rises vertically within the aquarium. When the diver 1 is filled with water, he will be on the bottom of the tank with the hole 3 inside the diver (FIG. 2). The escaping air bubbles from the hole 3 are trapped within the hollow diver 1. As the diver 1 fills with air it becomes more buoyant. After a period of several seconds (depending upon the rate at which air is supplied from the air source) the total weight of the diver will be less than the weight of the displaced water — at which time the diver 1 will slowly ascend up the tube 2. When the necked-down portion 4 of tube 2 is reached, there will be a relatively large gap between the hole 9 and tube 4 (FIG. 3). At this point, the trapped air escapes and the diver fills with water causing it to slowly descend to the bottom. The cycle is again repeated, etc., with the diver ascending and descending at periodic intervals to provide a realistic and fascinating motion within the aquarium.

The outside diameter of the tube 2 is preferrably on the order of one-eighth inch. The necked down portion 4 should be about three thirty-seconds inch in diameter. The bottom opening 8 in the diver is not critical so long as it is large enough to collect most of the escaping bubbles from the hole 3 when it is above the hole 3. The top opening should be large enough to permit the diver to slide freely up and down the tube 2, but its diameter is not critical since the boundary surface tension prevents air from escaping until there is a rather substantial gap between the tube 2 and hole 9, (i.e., at the necked down portion 4 of the tube). Excellent results were obtained with a prototype having a bottom opening 8 of three-eighths inch, a tube 2 diameter of one-eighth inch, a necked down portion 4 having a diameter of three thirty-seconds inch, and a top opening 9 of seven thirty-seconds inch.

FIG. 4 shows an alternative embodiment comprising an S-shaped slanted tube 11 and a moveable octopus 14 which travels between the cave 12 and the necked down portion 13 of the tube 11. In order to add life and realism, the tentacles can be made of flexible plastic (such as polyvinyl) so that they will collimate behind the body of the octupus during ascent and then spread apart as the octupus descends. It will be obvious that the tube 13 could also be curved or bent in other shapes — the only requirement being that its slope at all points be such that the octupus does not become stuck in between the point 13 where air is expelled or the point 15 where air is collected.

The straight vertical tube (embodiment shown in FIG. 1) is of course, more advantageous from a reliability standpoint since there is no place where the moveable object can "stick," i.e., since the moveable object (e.g., the diver 1), is always directly above the air hole 3, it will continue to collect the rising air bubbles as it rises so that it will always return to the necked down portion 4. If air is supplied at a high rate, the diver 1 will begin its ascent even before it reaches the bottom. Thus, if so desired, the diver can be caused to continuously move up and down without pausing.

Figure 5:
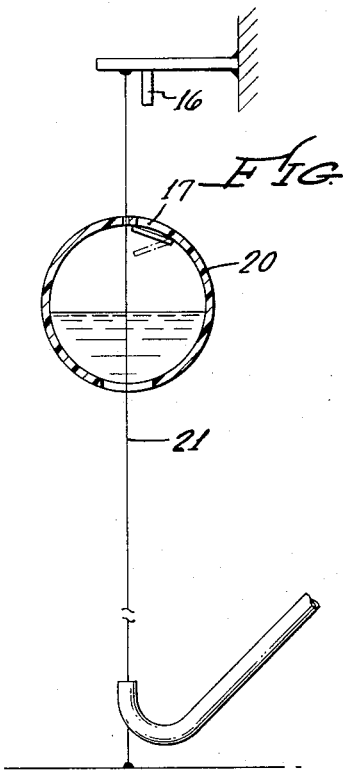
FIG. 5 shows an alternative valve arrangement for releasing trapped air in a diving bell which rides on a transparent leader.
Figure 6:
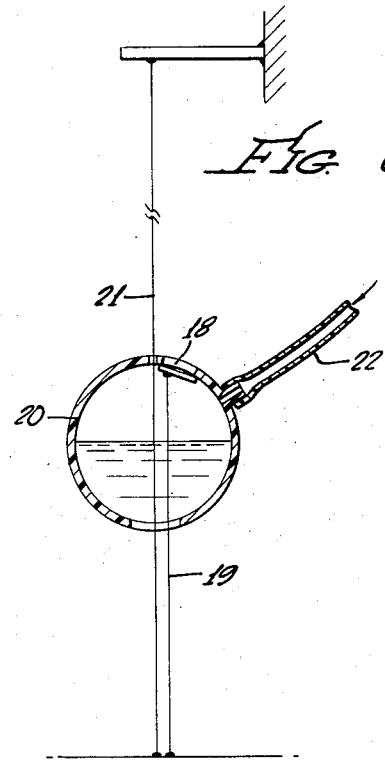
FIG. 6 shows an alternative valve trip employing a second transparent leader and a flexible air hose for entering air into the bell.

FIGS. 5 and 6 show alternative embodiments which utilize moveable valve arrangements for releasing the air. In FIG. 5, the moveable object (diving bell 20), rides up and down on an invisible nylon leader 21 rather than a tube. Air is collected in the same manner as shown in FIG. 1, but the release is accomplished by the valve trip 16 which pushes open the valve 17. In FIG. 6, the valve 18 is pulled open by a nylon leader 19 which is anchored to the bottom of the tank. FIG. 6 also shows that the air supply could be connected (through a flexible tube 22) directly to the bell — or alternatively to the helmet of the diver shown in FIG. 1, as is the case with actual deep sea diving equipment.

The basic concepts disclosed are of course not limited to the particular embodiments illustrated. The teachings may be applied to numerous other aquarium objects such as submarines, scuba divers, miniature whales, etc. Nor are the elements restricted to the particular example shown, it being entirely feasible that one would wish to combine some of the features shown in the embodiment of FIG. 4 with some of the features shown in FIG. 2, etc. Thus, although preferred embodiments have been shown and described, it will be understood that the invention is not limited thereto, and that numerous changes, modifications and substitutions may be made without departing from the spirit of the invention.

We claim:
1. An aquarium apparatus comprising:
 a first station near the bottom of the aquarium;
 a second station near the surface of the aquarium;
 a heavier than water object having a hollow inner chamber;
 means for entering air into said object when said object is in the vicinity of said first station whereby said object will become buoyant and rise toward the surface;
 means for releasing air from said object when said object reaches said second station whereby said object will descend;
 a hollow tube between said first and second stations said object being slidably mounted on said tube;
 said tube having a necked down portion at said second station and a small opening in its wall at said first station and wherein said object is adapted to have an upper and lower hole which will accommodate said tube.
2. An aquarium apparatus comprising:
 a first station near the bottom of the aquarium;
 a second station near the surface of the aquarium;
 a heavier than water object having a hollow inner chamber;
 means for entering air into said object when said object is in the vicinity of said first station whereby said object will become buoyant and rise toward the surface;
 means for releasing air from said object when said object reaches said second station whereby said object will descend;
 a hollow transparent tube between said first and second stations said object being slidably mounted on said tube said tube having a necked down portion proximate to said second station;
 and wherein said means for releasing air from said object comprises:
 a hole in the top of said object having a diameter sufficient to accommodate the diameter of said tube whereby air trapped within said object will be retained until said object reaches the necked down portion of said tube.
3. The apparatus recited in claim 3 wherein said means for entering air into said object comprises:
 means for pumping air into said tube;
 an opening in the tube proximate to said first station;
 an opening on the underside of said object having a size sufficient to collect air bubbles emitted through the opening in said tube.
4. The apparatus recited in claim 3 wherein said object is a miniature diver.

* * * * *